(12) United States Patent
Besliu et al.

(10) Patent No.: US 10,151,333 B2
(45) Date of Patent: Dec. 11, 2018

(54) MODULAR ACTUATOR WITH SNUBBING ARRANGEMENT

(71) Applicant: Safran Landing Systems Canada Inc./ Safran Systèmes d'Atterrissage Canada Inc., Ajax (CA)

(72) Inventors: Marin Besliu, Mississauga (CA); Chris Bryant, Pickering (CA); Howard Smith, Niagara Falls (CA)

(73) Assignee: Safran Landing Systems Canada Inc./ Safran Systèmes d'Atterrissage Canada Inc., Ajax (CA)

( * ) Notice: Subject to any disclaimer, the term of this patent is extended or adjusted under 35 U.S.C. 154(b) by 24 days.

(21) Appl. No.: 14/767,556

(22) PCT Filed: Feb. 13, 2014

(86) PCT No.: PCT/CA2014/000105
§ 371 (c)(1),
(2) Date: Aug. 12, 2015

(87) PCT Pub. No.: WO2014/124519
PCT Pub. Date: Aug. 21, 2014

(65) Prior Publication Data
US 2015/0377262 A1 Dec. 31, 2015

Related U.S. Application Data

(60) Provisional application No. 61/764,292, filed on Feb. 13, 2013.

(51) Int. Cl.
*F16F 9/32* (2006.01)
*F15B 15/14* (2006.01)
(Continued)

(52) U.S. Cl.
CPC ........ *F15B 15/222* (2013.01); *F15B 15/1438* (2013.01); *F15B 15/1447* (2013.01);
(Continued)

(58) Field of Classification Search
CPC .............. F15B 15/1438; F15B 15/1447; F15B 15/1457; F15B 15/222; F16B 3/04; F16F 9/3242; F16J 1/12
See application file for complete search history.

(56) References Cited

U.S. PATENT DOCUMENTS 2,952,480 A * 9/1960 Prill ...................... F16L 37/088
220/319
3,704,650 A * 12/1972 Berg ..................... F15B 15/222
91/395

(Continued)

OTHER PUBLICATIONS

International Search Report for International Application No. PCT/CA2014/000105 dated May 6, 2014.

*Primary Examiner* — Logan Kraft
(74) *Attorney, Agent, or Firm* — Christensen O'Connor Johnson Kindness PLLC

(57) ABSTRACT

Described is a modular linear actuator for use in an aerospace application, comprising: a piston housing having a closed end and an open end; a piston rod slideable within an interior of the piston housing between an extended position and a compressed position, the piston rod having a first end proximal to the closed end of the piston housing and a second end distal to the closed end of the piston housing; an attachment mechanism for removably attaching a lug end to the closed end of the piston housing, the lug end for attaching the actuator to a first component; an attachment mechanism for removably attaching a rod end to the second end of the piston rod, the rod end for attaching the piston rod to a second component; and, a piston head removably attached to the first end of the piston rod, the piston head for providing a snubbing engagement with the closed end of the piston housing.

17 Claims, 17 Drawing Sheets

(51) Int. Cl.
    *F15B 15/22*     (2006.01)
    *F16B 3/04*     (2006.01)
    *F16J 1/12*     (2006.01)

(52) U.S. Cl.
    CPC ........ *F15B 15/1457* (2013.01); *F16F 9/3242* (2013.01); *F16J 1/12* (2013.01); *F16B 3/04* (2013.01)

(56) References Cited

U.S. PATENT DOCUMENTS

| | | | | |
|---|---|---|---|---|
| 4,048,905 | A | | 9/1977 | Souslin |
| 4,296,675 | A | * | 10/1981 | Gies ...................... F15B 15/222 |
| | | | | 277/580 |
| 4,771,678 | A | * | 9/1988 | Walker ................... F01B 29/00 |
| | | | | 403/377 |
| 4,878,419 | A | * | 11/1989 | Vick ................... F15B 15/1438 |
| | | | | 277/434 |
| 5,286,135 | A | * | 2/1994 | James ....................... F16B 3/04 |
| | | | | 403/319 |
| 5,517,898 | A | * | 5/1996 | Kim ...................... F15B 15/225 |
| | | | | 91/24 |
| 5,720,368 | A | | 2/1998 | Richardson |
| 6,101,922 | A | * | 8/2000 | King ................... F15B 15/1438 |
| | | | | 92/164 |
| 6,481,331 | B1 | * | 11/2002 | Guo ..................... F15B 15/222 |
| | | | | 91/395 |
| 7,387,061 | B2 | * | 6/2008 | Kobata ................ F15B 11/048 |
| | | | | 60/461 |

\* cited by examiner

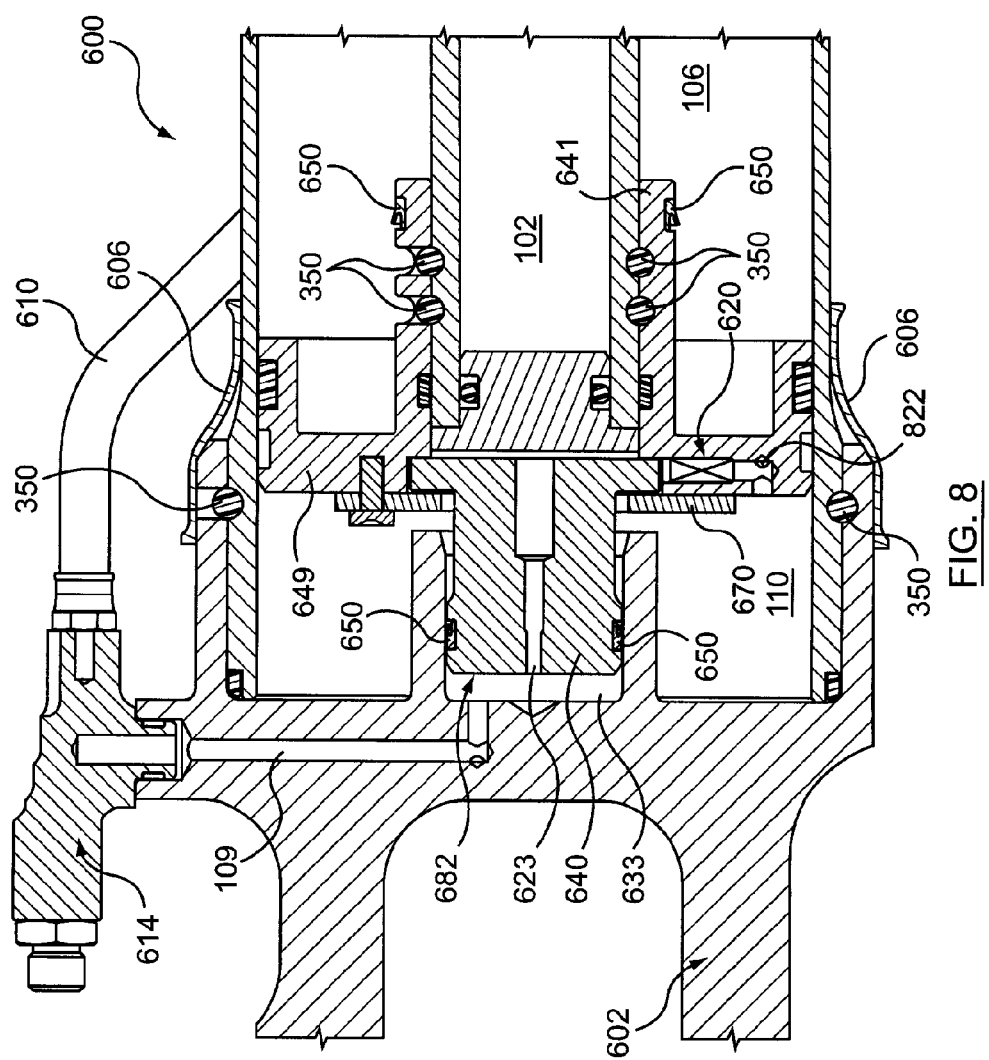

MODULAR ACTUATOR WITH SNUBBING ARRANGEMENT

FIELD OF THE INVENTION

The present invention relates to linear actuators and more particularly to modular linear actuators having a snubbing device for dampening loads at the end of stroke movement of the actuator.

BACKGROUND OF THE INVENTION

Linear actuators are commonly used to propel or oscillate mechanical components such as components that are used in aerospace applications. Actuators used in the aerospace industry, including linear actuators, are commonly made of many interworking parts. When one of the interworking parts breaks or becomes damaged, it may be necessary to replace the entire actuator. Similarly, each actuator in its entirety may need to be custom designed for each application. The assembly costs for such actuators is controlled through the selection of raw materials as well as incremental simplification of part geometries to facilitate manufacture.

In non-aerospace applications, actuators can be made of larger connected parts or components that, when in operation, cause free play between (or relative movement of) adjacent components. In these non-aerospace applications this type of free play is not typically detrimental to the function of the actuators. Non-aerospace actuators therefore have not needed a mechanism for compensating for free play.

Conventional designs of actuators for aerospace applications use threaded or otherwise pre-loaded mechanical connections between the numerous interworking parts and are not modular. These parts and the components on which the actuators operate are therefore not subject to free play. As such, there has not been a need for a mechanism in aerospace actuators to compensate for free play.

Actuators used in non-aerospace applications typically use a snubbing arrangement that includes a plunger entering into a cavity to establish an annular orifice at a predetermined distance from the end of the stroke. This narrowing, annular orifice acts to progressively restrict the fluid discharged from the unpressurized chamber until the end of the stroke is reached. The size of the annulus is chosen to provide the desired reduction in piston velocity.

Snubbing schemes used in non-aerospace actuators depend upon the resistance to fluid through passages. This can be problematic because the resistance in the fluid is sensitive to many factors. To ensure that the snubbing action is consistent, the rod and cylinder assemblies that comprise the actuator must be carefully aligned by controlling the manufacturing tolerances on mating features to a very high degree of precision, driving up cost. Nevertheless, the amount of resistance to the fluid flow is highly dependent on the area of the annulus formed by the plunger, the shape of the annulus (it may be irregular due to positional misalignment), and the change in fluid viscosity due to temperature changes.

Snubbing schemes for actuators used in aerospace applications commonly require holes to be drilled in the cylinder of the actuator in areas of high stress concentration creating a fatigue issue especially in applications requiring high pressure (5000 psi, for example). FIG. 11 illustrates a prior art blanked passage snubbing arrangement. There is unrestricted flow until the piston ring crosses the first drilling at which point the only fluid path is through the restrictor. The size of the effective orifices in the restrictor is chosen to provide the desired reduced piston velocity. Drilling a hole close to the junction of the cylinder body and head can lead to failures in high pressure applications. Other designs can require an overlap of the lug end over the outer cylinder that would require fluid to pass through two separate components that require complex and costly sealing arrangements.

The present invention addresses at least one of the above problems.

SUMMARY OF THE INVENTION

Accordingly, there is provided a modular linear actuator, comprising a piston housing having a closed end and an open end; a piston rod slideable within an interior of the piston housing between an extended position and a compressed position, the piston rod having a first end proximal to the closed end of the piston housing and a second end distal to the closed end of the piston housing; a retention wire for removably attaching a lug end to the closed end of the piston housing; and a piston head attached to the first end of the piston rod, the piston head operable to provide a snubbing engagement with the lug end. In some aspects, a first circumferential notch on an inner surface of the lug end aligns with a second circumferential notch on an outer surface of the closed end of the piston housing to receive the retention wire. In a further aspect, the lug end defines a tangential slot connecting an outer surface of the lug end to the first circumferential notch of the lug end, the tangential slot for inserting and removing the retention wire to attach or detach the lug end to the closed end of the piston housing. In yet a further aspect, the retention wire further comprises a hook to latch onto the outer surface of the closed end of the piston housing.

In some aspects, the lug end is removably attached to the piston housing using a second retention wire. In yet other aspects, the piston head is removably attached to the first end of the piston rod using a second retention wire. In a further aspect, any one of the first retention wire and the second retention wire is shaped as a helix to provide an axial force in the direction of the longitudinal axis of the piston rod for compensating for free play between the piston rod and the rod end. In other aspects, any one of the first retention wire and the second retention wire comprises at least one wave for providing a force between the piston rod and the rod end for compensating for free play between the piston rod and the rod end.

In some further aspects, the piston head and the closed end of the piston housing define a first chamber for holding hydraulic fluid therebetween and the piston head and the open end of the piston housing define a second chamber for holding hydraulic fluid therebetween, the piston head comprises a flow control device to provide the snubbing engagement in the compressed position by controlling the rate of flow of hydraulic fluid into the first chamber to control pressure in the first chamber relative to pressure in the second chamber. In some aspects, the piston head further comprises a spear extending from the piston head into the first chamber and the lug end defines a cavity that sealingly engages the spear in the compressed position directing hydraulic fluid through the flow control device. The spear can further comprises a contact seal that dynamically re-engages the cavity. The spear can also be attached to the piston head using a retention plate. The modular linear actuator can further comprising a gland removably attached to the open end of the piston housing, the gland defining a gland cavity opening into the second chamber, the piston head further comprising a piston head extension that sealingly engages the gland cavity in the extended position, the gland further comprising a second flow control device coupled to the gland cavity to provide the snubbing engagement in the extended position by controlling the rate of flow of hydraulic fluid from the gland cavity. In some aspects, the piston head extension can further comprises a contact seal that dynamically re-engages the gland cavity. In some aspects, the modular linear actuator can further comprising a hydraulic fitting attached near the open end of the piston housing and coupled to the gland cavity. In some aspects, the gland can be removably attached to the open end of the piston housing by a second retention wire.

In another aspect, a retention wire is provided for use in a modular linear actuator, comprising: an elongate flexible wire having two free ends, the wire forming a substantially circular shape in a first plane and comprising one or more waves spaced along the wire, the waves extending in a second plane. The retention wire can have one or more waves form a sinusoidal pattern along the wire, the free ends are offset from each other, or the waves form a helical pattern in the second plane.

BRIEF DESCRIPTION OF THE DRAWINGS

In order that the subject matter may be readily understood, embodiments are illustrated by way of examples in the accompanying drawings, in which:

FIG. 8 is a cross-sectional view of an alternative embodiment of the modular actuator described herein.

DETAILED DESCRIPTION

Figure 1:
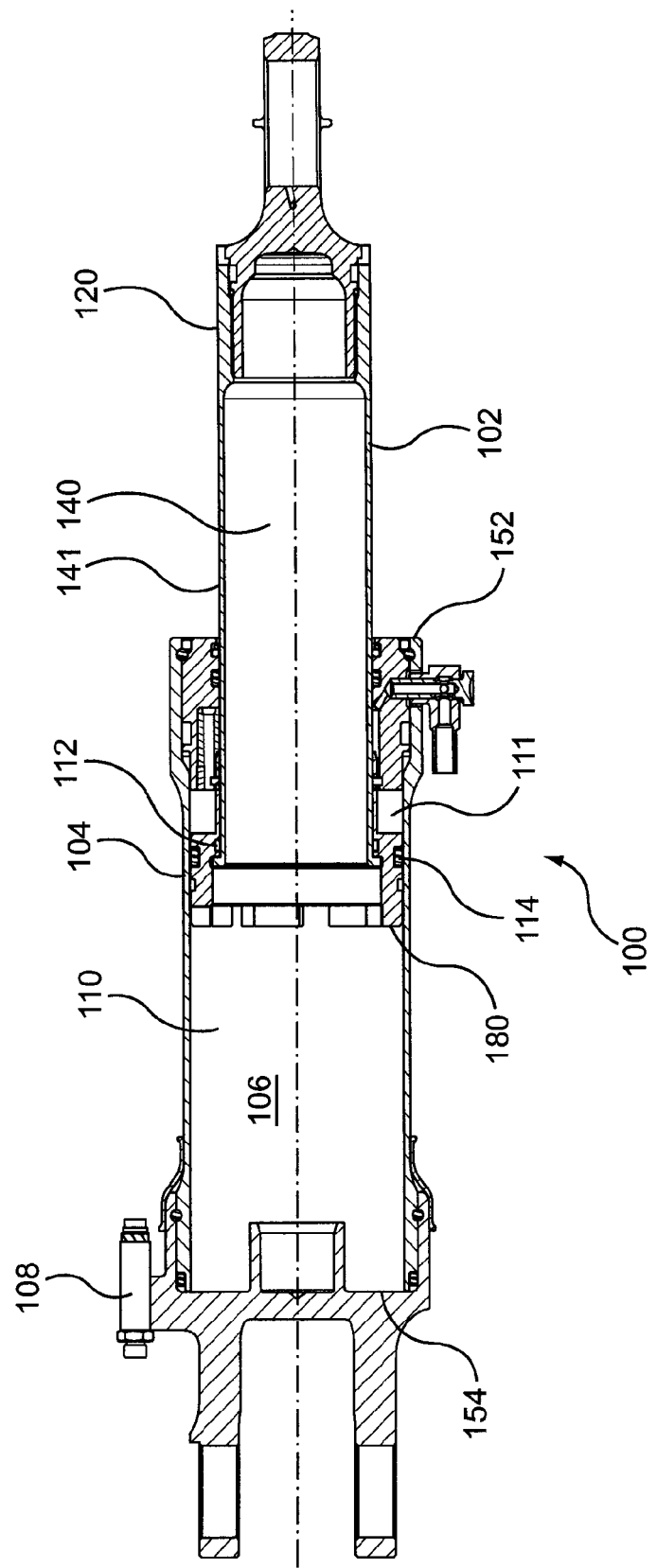
FIG. 1 is a cross sectional view of a piston rod in an extended position.

Disclosed is an actuator that is formed from modular components, at least two of the modular component are connected to each other using one or more attachment mechanisms, also referred to herein as retention wires. The retention wire forms a mechanical connection between the components within the actuator. The connection of the components, through the use of the retention wires, can introduce a spring load between fastened components that is sufficient to resist anticipated applied loads preventing free play that would be otherwise present.

Disclosed is a modular linear actuator for hydraulic or pneumatic actuation. The modular actuator comprises a piston housing that slideably houses a piston rod. The piston rod slides between extended and compressed positions thereby defining an oscillating motion. The modular actuator provides precise snubbing (i.e. the reduction of piston speed) at the end of one or both of the extension and compression strokes of the piston rod during oscillation. The term "precise" is used to refer to the use of a flow control device to keep the flow consistent. This consistent flow can be regardless of temperature changes. The modular actuator further compensates for the free play at either end of the piston rod during operation through the use of attachment mechanisms. According to an embodiment of the present invention the attachment mechanisms are retention wires for connecting or joining different components together. Precise snubbing can be achieved using a floating plunger and cavity scheme that incorporates a precision flow control device and an engaging-disengaging seal.

Preferred embodiments may include any one or a combination of any two or more of any of the following features:

In one embodiment, the closed end of the piston housing comprises a lug end, wherein the lug end is attached to the piston housing using a retention wire. In one embodiment the components are connected using more than one retention wire.

In a further embodiment, the piston head is removably attached to the first end of the piston using a retention wire.

In one embodiment, the retention wire, connecting the piston rod and rod end, is shaped as a helix to provide an axial force in the direction of the longitudinal axis of the piston rod and is operable to compensate for free play between the piston rod and the rod end. In another embodiment, the shape of the retention wire comprises at least one wave for providing a force between the piston rod and the rod end for compensating for free play between the piston rod and the rod end. Free play is the relative motion between two components that is not required for the operation of the device; it is extra, unnecessary movement. The axial force helps to eliminate or limit free play. No damping is provided because there is no motion. Likewise, the retention wire connecting the lug end and piston housing is preferably shaped as a helix to provide an axial force in the longitudinal direction of the piston housing for compensating for free play between the lug end and the piston housing. In another embodiment, the shape of the retention wire comprises at least one wave for providing a force between the lug end and the piston housing for compensating for free play between the lug end and the piston housing.

In one embodiment, the piston head is removably attachable to the first end of the piston rod using a retention wire. The retention wire is shaped as a helix to provide an axial force in the direction of the piston rod for compensating for free play between the piston rod and the piston head. The shape of the retention wire comprises at least one wave to provide a force between the piston rod and the piston head for compensating for free play between the piston rod and the piston head.

In an alternate embodiment, there is provided rubber boots attached over at least one of the first attachment mechanism and the second attachment mechanism for inhibiting corrosion and abrasion.

In one embodiment, the first end of the piston rod and the closed end of the piston housing define a first chamber for holding hydraulic fluid and the opposing side of the first end of the piston rod and the open end of the piston housing define a second chamber for holding hydraulic fluid. The closed end of the piston housing defines a discharge exit for allowing fluid to pass into or out of the first chamber. The open end of the piston housing defines a passage for allowing fluid to pass into and out of the second chamber. The piston housing may further comprise a transfer tube connecting a passage defined in the open end of the piston housing with the discharge exit defined in the closed end of the piston housing.

In one embodiment, the hydraulic pressure in the first chamber and the hydraulic pressure in the second chamber are controlled using a hydraulic pump.

In one embodiment, the piston head comprises a flow control device for allowing a precise amount of hydraulic fluid to pass in to or out of the first chamber for controlling the pressure in the first chamber relative to the pressure in the second chamber.

There is also provided the use of the modular linear actuator, described herein, in an aerospace application.

In some embodiments, the linear modular actuator may further comprise a second chamber at the open end having hydraulic pressure, the second chamber having an orifice for allowing fluid to flow into and out of the second chamber, wherein the movement of the piston rod is controlled by the hydraulic pressure in the first chamber relative to the hydraulic pressure in the second chamber. The linear actuator further comprises a transfer tube connecting the valve to the orifice for allowing fluid to pass between the first chamber and the second chamber. The linear actuator is a modular linear actuator with each component connected together using an attachment mechanism. In one embodiment the attachment mechanism is a retention wire.

In one embodiment, the piston head may be attached to the first end of the piston rod using a retention plate.

In one embodiment, the flow control device can be a flow control device, for example a VISCO JET™ flow restrictor, or a sharp orifice flow control device.

For convenience, like numerals in the description refer to like structures in the drawings.

Actuators

An actuator is a mechanical device for moving or controlling components of a mechanism or system. Actuators receive energy and convert the energy into the mechanical motion of an actuator member. For example, the actuator member may be able to move between an extended position and a retracted position. The energy may be transmitted to the actuator member through the use of pressurized liquids (i.e. hydraulics) so that the actuator member moves in response to the pressure changes in the liquid. Alternatively, or additionally, the energy may be transmitted to the actuator member electrically or through other known means of transmitting energy. The energy transmission and the resulting movement of the mechanisms of the actuator (e.g. the movement of the actuator member) may be controlled remotely or locally and may be manually or automatically operated.

Actuators can be used to operate various components of larger systems. For example, an actuator can be used to operate (i.e. extend and/or retract) the landing gear or undercarriage of an aircraft. By way of further example, actuators can be used in a motor to transmit energy into movement of a device (e.g. a car, plane, drill, etc.).

Although the term "actuator" is used herein, it is recognized that other linearly movable parts could be substituted for the actuator without departing from the invention.

Pistons

A piston assembly is one example of an actuator. A piston assembly includes a piston that can move within the interior of a second member to transform energy imparted by a fluid entering or expanding inside the second member into rectilinear motion. The second member can be a cylinder for example. The fluid may, for example be compressed air, explosive gases, or steam.

Reference will now be made to the components of a actuator assembly 100, described herein, without reference to the floating plunger which will be described in further detail below. The actuator assembly 100 shown in FIGS. 1 and 2 includes a cylindrical piston rod assembly 102 that moves within an interior 106 of a cylindrical housing assembly 104 between an extended position and a retracted position. The cylindrical housing assembly 104 has a closed end 154 and an open end 152. The cylindrical piston rod assembly 102 has a middle portion 140 between a first end 112 and a second end 120. The first end 112 of the piston rod assembly 102 is proximal to the closed end 154 of the cylindrical housing assembly 104, when the piston rod assembly 102 is located within the cylindrical housing assembly 104, while the second end 120 is distal to the closed end 154 of the cylindrical housing assembly 104. When the piston rod assembly 102 is in the extended position, the piston rod assembly 102 extends part way out of the open end 152 of the cylindrical housing assembly 104.

When the cylindrical piston rod assembly 102 is in the cylindrical housing assembly 104 a first fluid chamber 110 is defined in the interior 106 of the cylindrical housing assembly 104, by the top surface 180 of the first end 112 of the piston rod assembly 102 and the cylindrical housing assembly 104. A second fluid chamber 111 is defined in the interior 106 of the cylindrical housing assembly 104 between the outer surface 141 of the middle portion 140 of the cylindrical piston rod assembly 102 and the cylindrical housing assembly 104. A manifold 108 is connected to the cylindrical housing assembly 104 and is fluidly connected to the fluid chambers 110, 111 located in the interior 106 of the cylindrical housing assembly 104 for allowing fluid and/or gas to enter and/or exit the interior 106.

Figure 2:
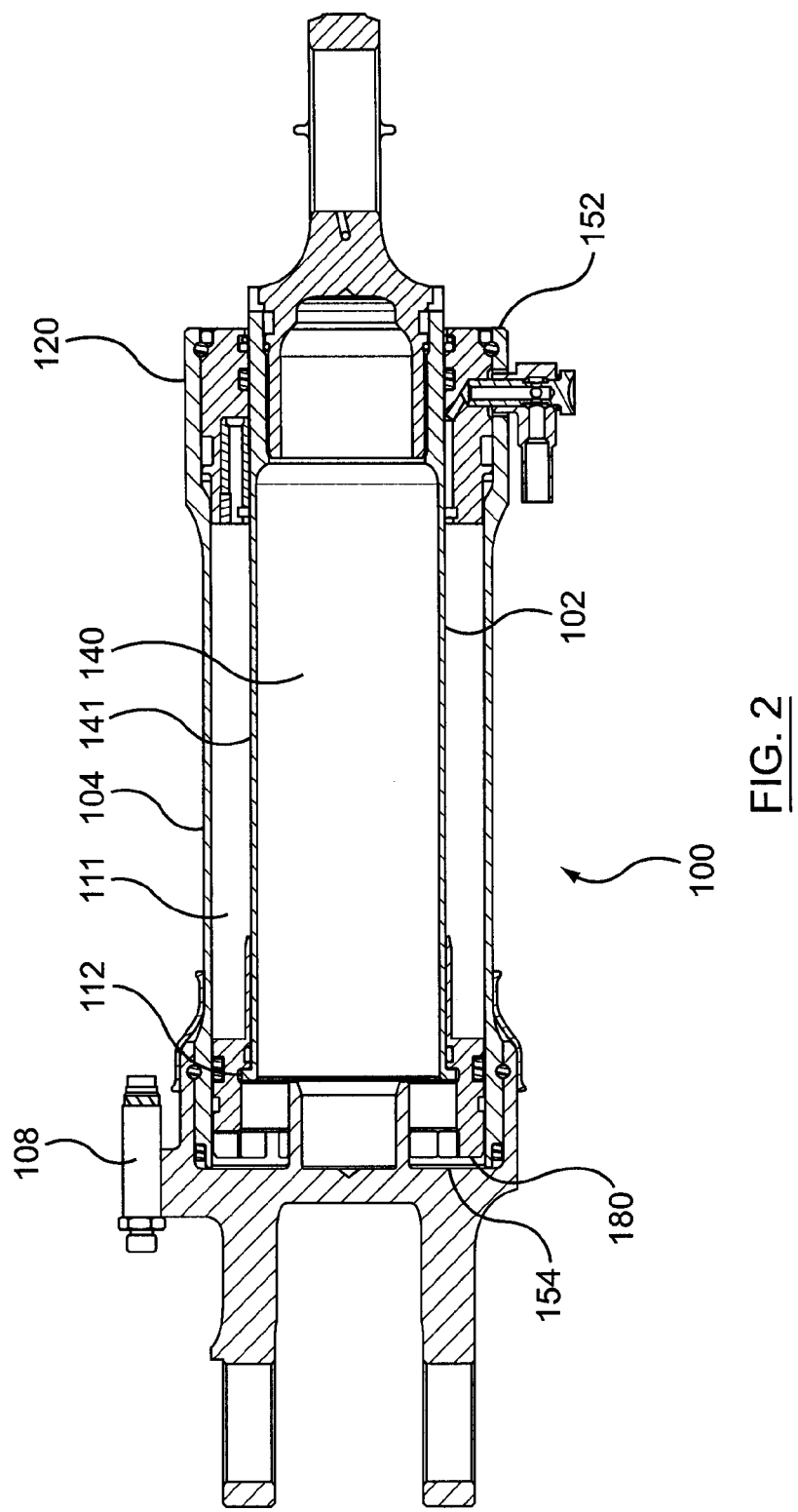
FIG. 2 is a cross sectional view of a piston rod in a retracted position.

The manifold 108 provides routing of fluid entering or exiting the first fluid chamber 110 (e.g. through a tube, pipe or other passage). When the pressure in the first fluid chamber 110 is increased, a corresponding force is exerted on the first end 112 of the cylindrical piston rod assembly 102 thus extending the piston rod assembly 102 outwardly from the cylindrical housing assembly 104 into the extended position. The extended position is shown in FIG. 1, for example. When the pressure in the second fluid chamber 111 is increased the piston rod assembly 102 is forced towards the closed end 154 of the cylindrical housing assembly 104, thus moving the piston rod assembly 102 into the retracted position. The retracted position is shown in FIG. 2, for example.

The piston rod assembly 102 forms a seal together with the cylindrical housing assembly 104 so that the pressure in the first fluid chamber 110 is not lost through gas or fluid leaking between the piston rod assembly 102 and the cylindrical housing assembly 104. This seal is formed with the assistance of one or more piston rings 114 which circumnavigates the piston rod assembly 102 and engages with the cylindrical housing assembly 104 thereby forming a seal with the cylindrical housing assembly 104.

Other piston rod assembly 102 mechanisms may be familiar to persons of ordinary skill in the art. It will be understood that this description is provided as an example only.

Retention Wires

Figure 3:
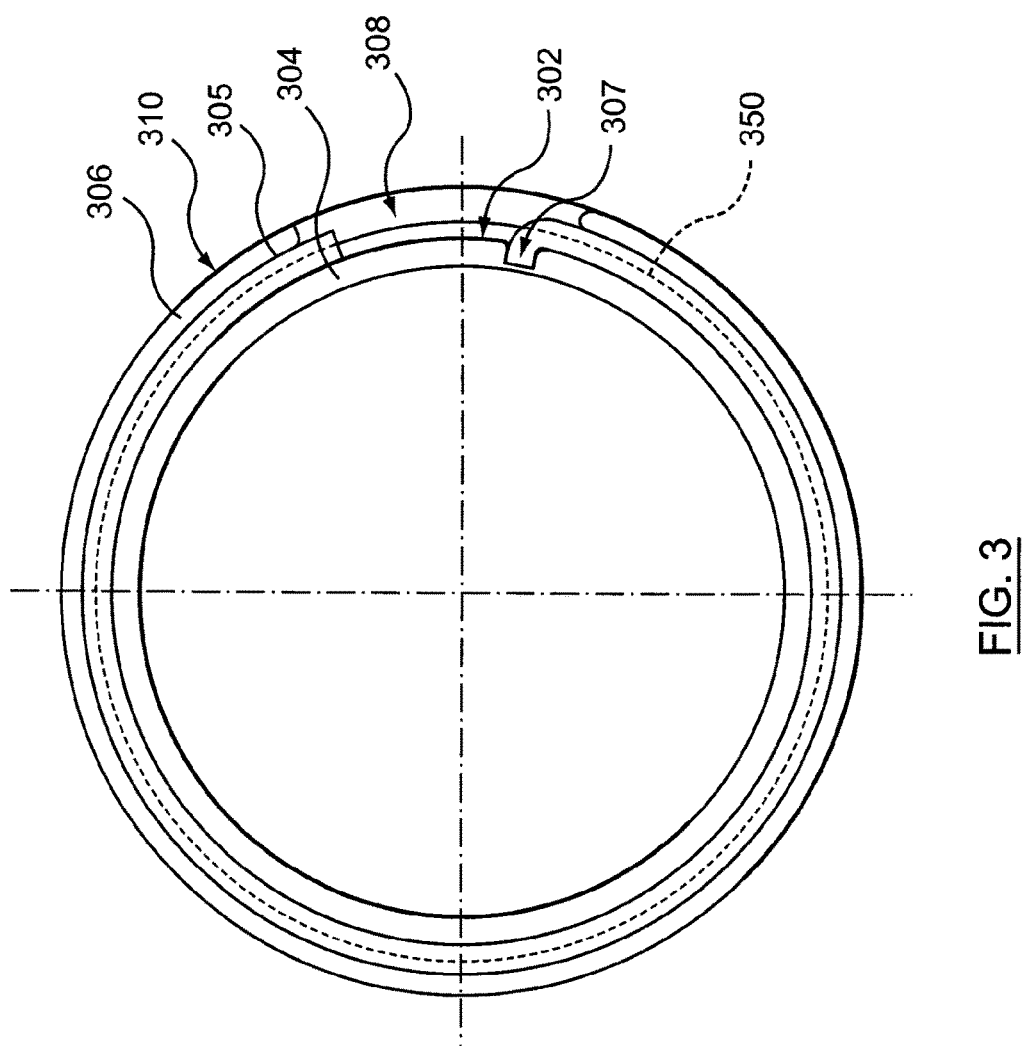
FIG. 3 is a cross sectional view of two components attached with a retention wire.

As described above, attachment mechanisms, referred to herein as retention wires 350 are used to removably attach two components together. FIG. 3 is a cross sectional view of an inner component 304, removably attached to an outer component 306 using a retention wire 350. Further detail is illustrated in FIGS. 9A-E. The outer component 306 has an internal surface 305. The inner component 304 is sized to fit into the interior of the outer component 306 so that an outer surface 302 of the inner component 304 abuts the inner surface 305 of the outer component 306. A semi-circle notch circumnavigates the interior surface 305 of the outer component 306 around its longitudinal axis, indicated in FIG. 4 at 420. A similar semi-circular notch circumnavigates the outer surface 302 of the inner component 304. A tangential slot 308 in the outer component 306 connects the groove in the outer component 306 with the exterior surface 310 of the outer component 306. Alternatively, a tangential slot 308 can pass from the notch on the outer surface 302 of the inner component 304 through the inner component 304 to an interior cavity of the inner component 304.

When the inner component 304 is inside the outer component 306, the exterior surface 302 of the inner component 304 abuts the interior surface 305 of the outer component 306. The notch in the inner component 304 aligns with the notch in the outer component 306 to form a circular groove. When the inner component 304 is inside the outer component 306 the two notches align to form a circular groove that is sized to receive the retention wire 350.

When the inner component 304 is inside the outer component 306 and the retention wire 350 is inside the groove therebetween, the inner component 304 is restricted from moving in the longitudinal direction relative to the outer component 306. More specifically, the retention wire 350 prevents the longitudinal movement of the inner component 304 relative to the outer component 306. FIG. 3 illustrates that one end of retention wire 350 can have a hook end 307.

FIG. 1 illustrates one example of the use of retention wires 350 in a piston assembly. In this illustration the inner component may be the cylindrical housing assembly 104 and the outer component may be the closed end of the cylindrical housing 154. Additional uses of the retention wires 350 will be described further below in reference to the modular piston described herein and FIGS. 6 and 7.

Figure 5A:
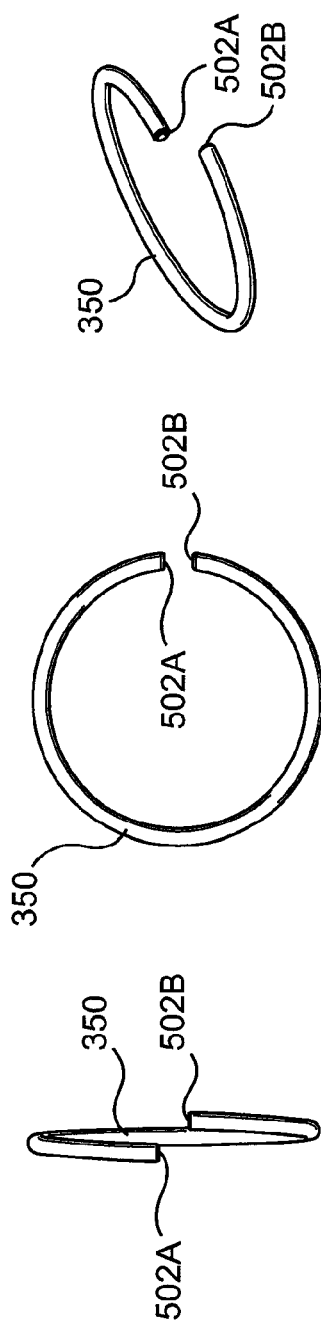
FIGS. 5A, 5B and 5C each show three perspective views of an embodiment of the retention wire.
Figure 5B:
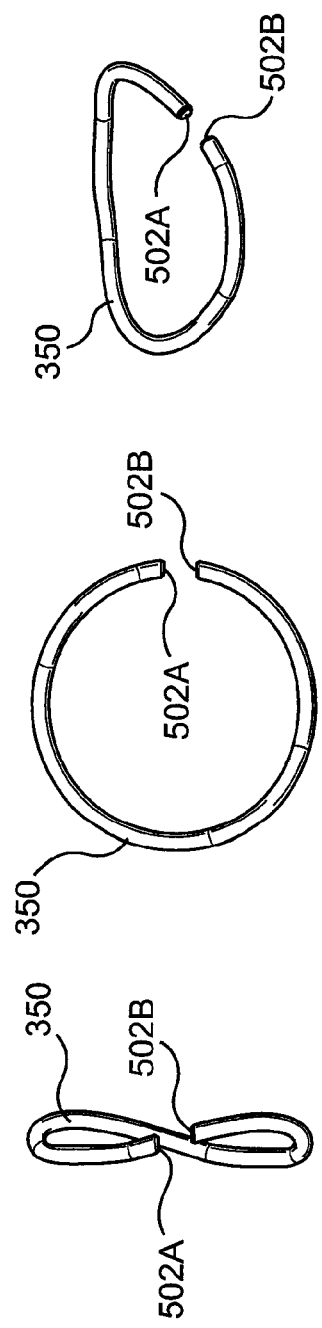
Figure 5C:
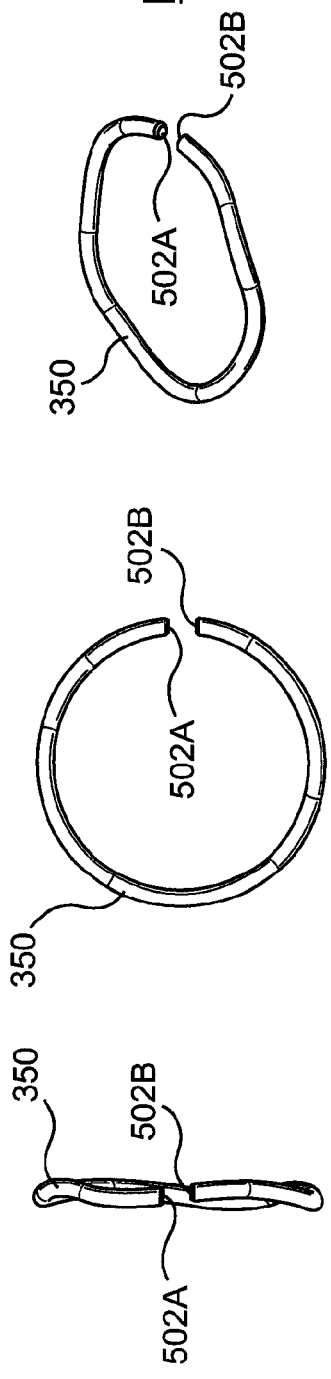

FIGS. 5A, 5B and 5C each show a different embodiment of the retention wire 350. The retention wire 350 has a first end 502A and a second end 502B and is bent in a generally circular shape. The circular shape is such that there is a gap between the first end 502A and the second end 502B. For example, the retention wire 350 can be formed in a helical ring such as a offset circular shape (FIG. 5A), a ring having a wavy or sinusoidal profile (FIG. 5B-C) or a circular shape with a multi-sinusoidal profile having more than one period (FIG. 5C).

FIG. 5 includes three kinds of retention wires that prevent free play for progressively higher loads. There is also one retention wire that does not prevent free play, which is a circular wire without an offset in the profile; a planar ring. A planar ring is preferably used in lower load applications and where the load is always in one direction, like between the lug end and the housing (where the load is radially outward). Retention wires 350 preferably have a circular cross-section. Two planar rings can also be installed in back-to-back grooves to reduce free play and distribute the load between both rings.

Figure 4:
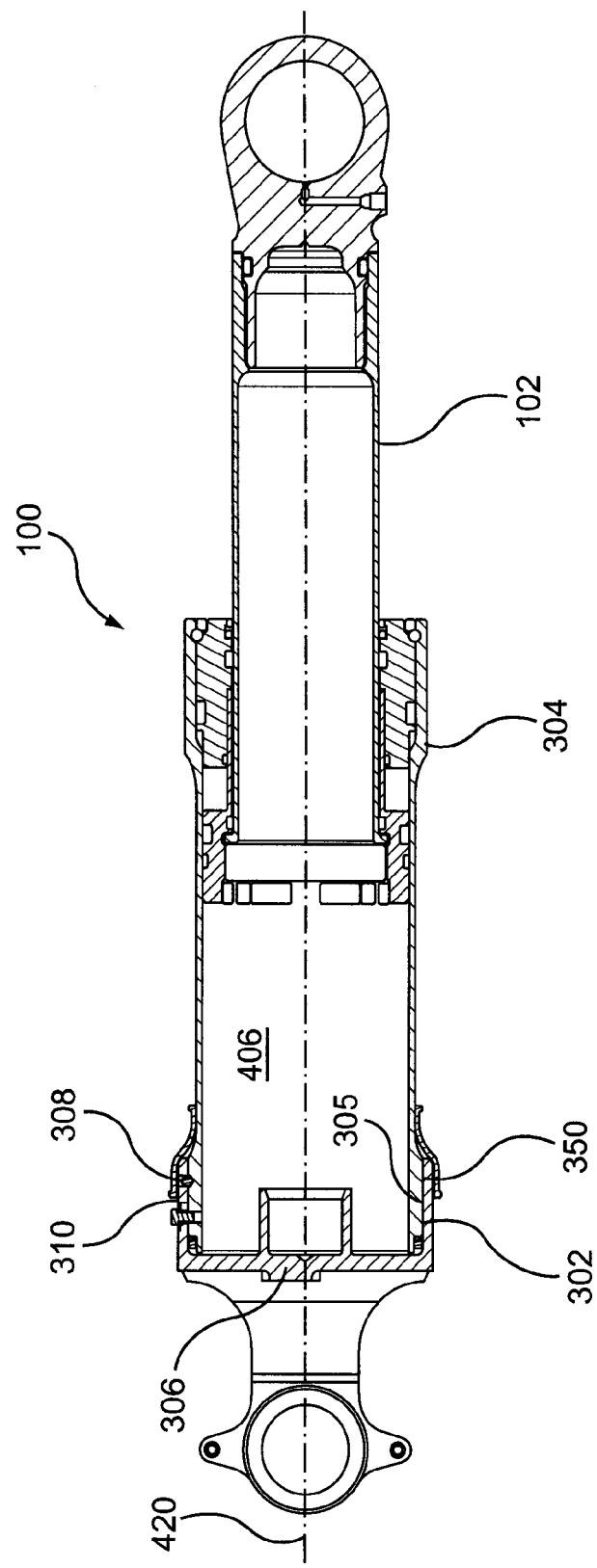
FIG. 4 is a partial cross-sectional view of a piston in an extended position, showing the placement of a retention wire as described herein.

Different shaped retention wires 350, such as those shown in FIGS. 5A-C, can provide an axial force or resistance along the longitudinal axis 420, shown in FIG. 4, of the components 304, 306. The retention wires 350 illustrated in FIGS. 5A-C can be described as substantially circular. The retention wires 350 shown in FIGS. 5A-C can provide a spring cushion reaction to forces along the longitudinal axis 420. In this manner, the retention wire 350 limits or prevents free play (or relative movement) of the connected components 304, 306 under load. A circular wire without an offset would allow free play (e.g. similar to 5A but planar with no offset in the profile). These wires that allow free play are used in instances where it is not critical for the elimination of free play, like between the lug end and the housing, since the forces always act in one direction regardless of whether the actuator is compressed or extended. As this may not be desirable, the spring forces between the fastened components 304, 306 resulting from the retention wires 350 shaped as in FIGS. 5A, 5B and 5C, can resist anticipated applied loads along longitudinal axis 420, thereby preventing the free play that would otherwise be present. Retention wires 350 are formed from a resilient material.

To insert the retention wire 350 into the tangential slot 308, the first end 502A of the retention wire 350 is received in the tangential slot 308 in the outer component 306. The retention wire 350 is pushed against the inner component 304. The inner component 304 is then rotated around the longitudinal axis 420 thereby pulling the retention wire 350 into the groove between the inner component 304 and outer component 306. When the retention wire 350 is inside the notches, the inner component 304 is inhibited from moving in the longitudinal direction 420 relative to the outer component 306. The retention wire 350 can also be removed through the tangential slot 308 to detach the inner component 304 and outer component 306. Alternatively, the tangential slot 308 can be in the inner component 304 rather than the outer component 306 so that the hook end 307 of the retention wire 350 is inserted into the tangential slot 308 through the inner component 304 rather than through the outer component 306.

Figure 10A:
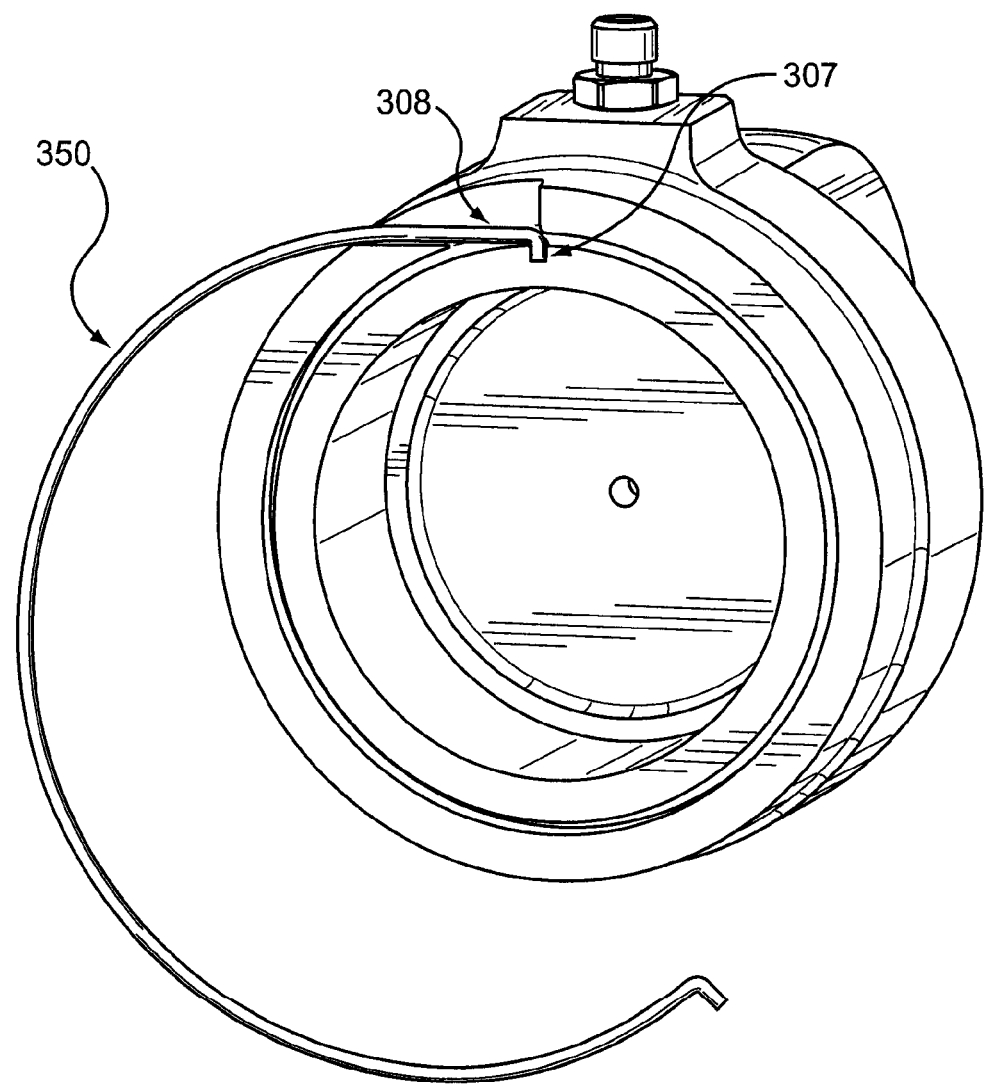
FIGS. 10A-C show a perspective cross-section of the installation sequence of the retention wire.
Figure 10B:
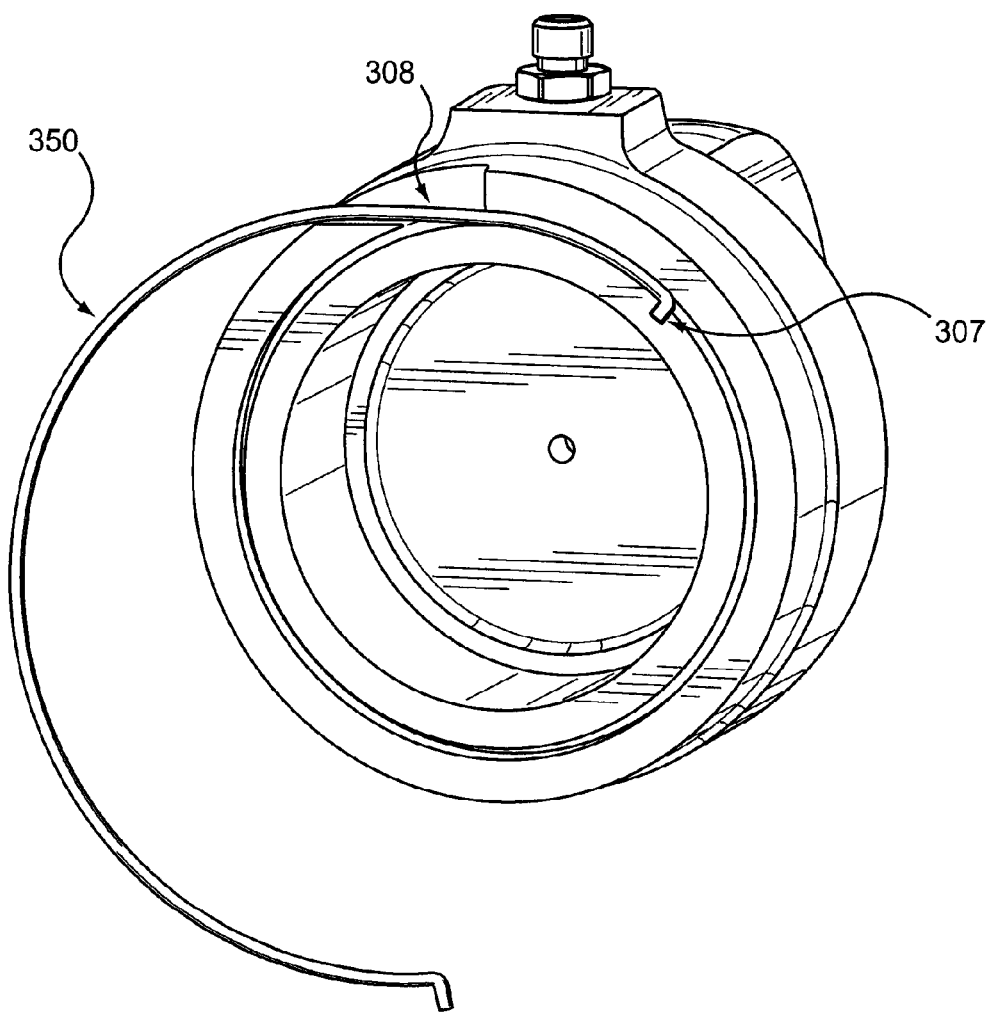
Figure 10C:
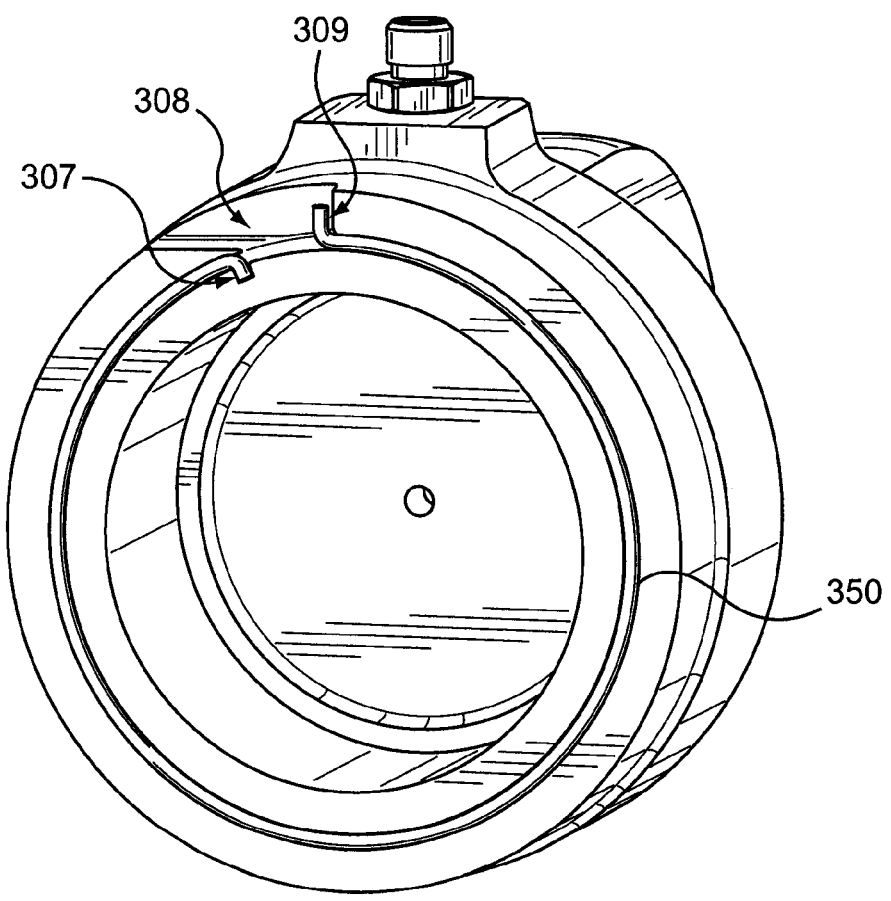
Figure 11:
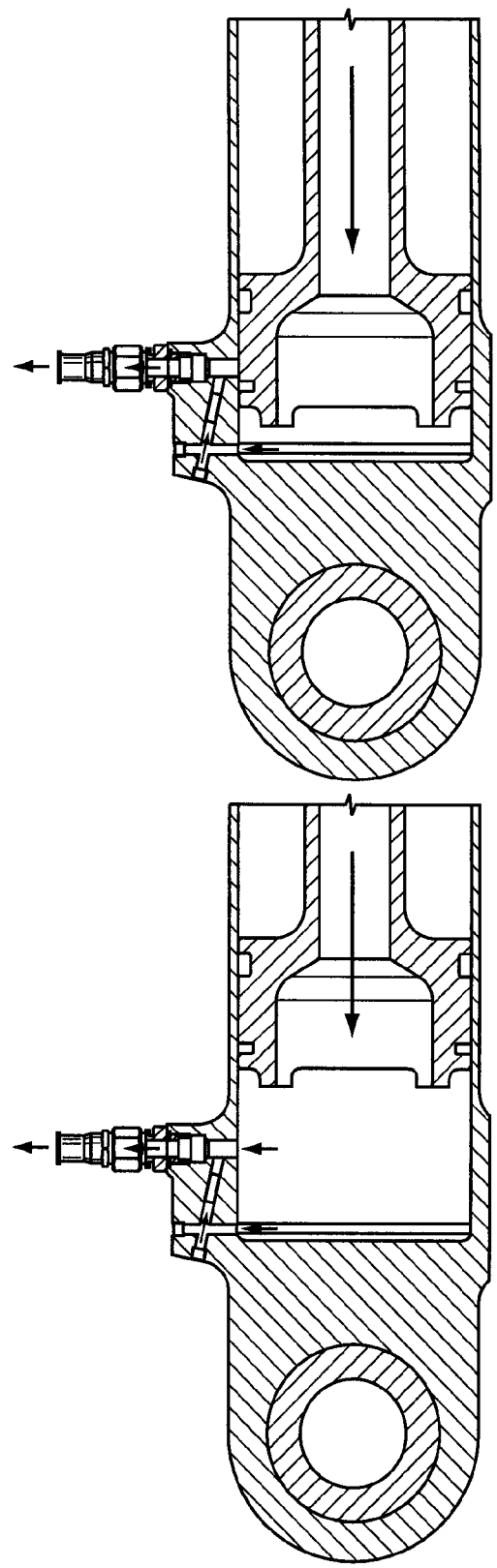
FIG. 11 illustrates a prior art blanked passage snubbing arrangement.

FIGS. 10A-C illustrate the installation procedure of retention wire 350. To insert the retention wire 350 into the annular cavity formed by the circumferential grooves in the inner surface of the outer component and the outer surface of the inner component, the retention wire 350 is introduced through the tangential slot 308 in the outer component. FIG. 10 A illustrates hook end 307 placed into a slot in the inner component through the tangential slot 308. Next, as shown in FIG. 10B, the retention wire 350 can be pushed or pulled into the cavity formed by the half grooves in the inner and outer components. The inner component can rotate to pull the retention wire 350 into the cavity. The retention wire is then pushed/pulled into the cavity until the wire lies entirely along the circumferential groove in the inner component. FIG. 10C illustrates the installed retention wire 350. When the retention wire is fully engaged in the cavity relative axial motion between the inner and outer components is limited. In some embodiments, retention wire 350 can include a second hook end 309 that can be used for removal of the retention wire 350.

A hook end 307 can be located at the first end 502A of the retention wire 350. The hook is designed to latch onto the inner component 304 when the retention wire 350 is inserted into the slot 308 to ensure that the retention wire 350 will move into the groove when the inner component 304 is rotated relative to the outer component 306.

Alternatively, the grooves that accept the retention wires 350 may have a non-circular form.

Use of the retention wire connections as described herein can allow large, complex components to be divided into several smaller components of reduced complexity thereby allowing for the modular actuator described herein, and discussed further below. It will be understood that the retention wires may be formed of any material suitable for the application within which they are being used, i.e. actuators and preferably actuators in aerospace applications, having a high spring characteristic. Examples of such materials include, but are not limited to steel and titanium.

Modular Actuator

Figure 6:
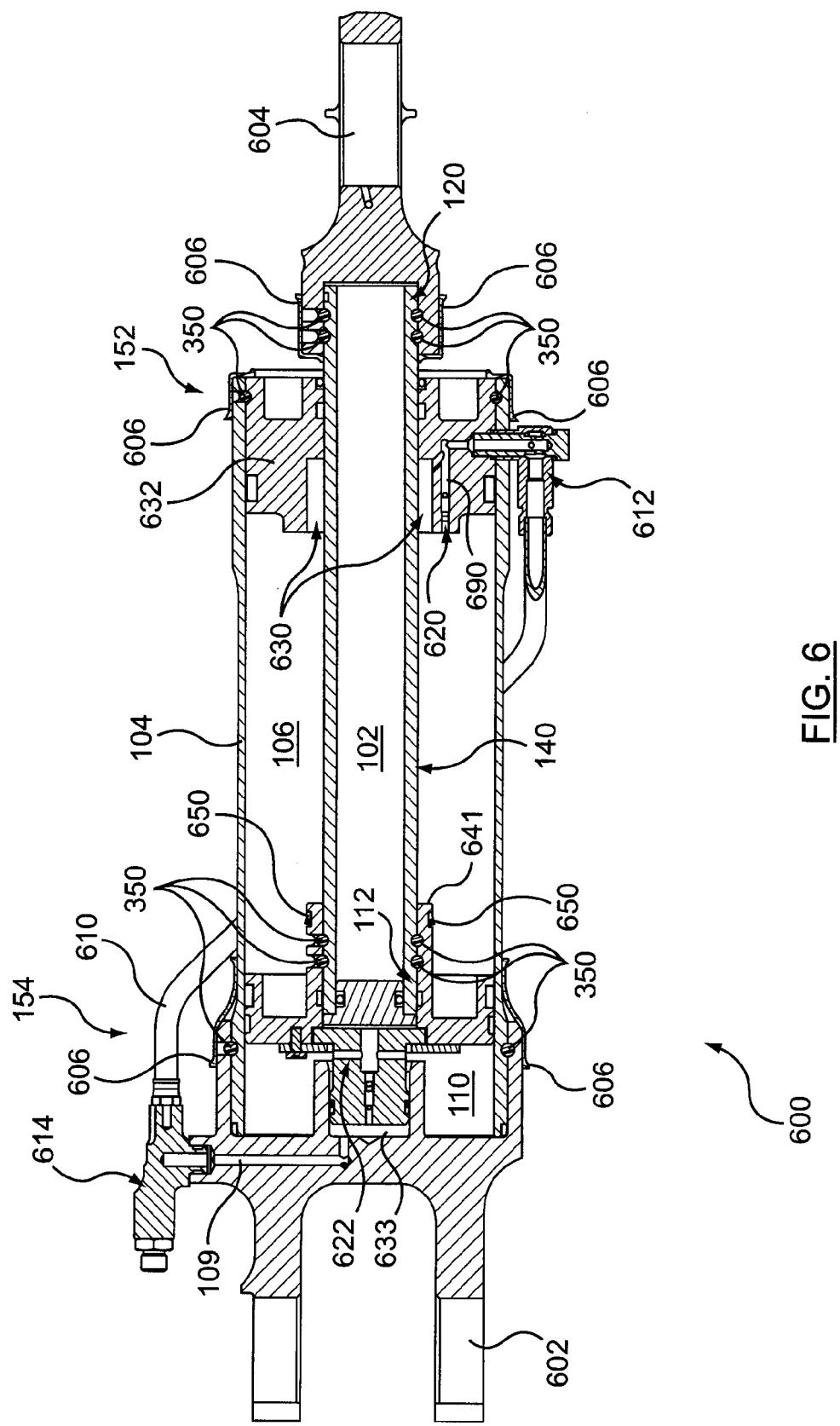
FIG. 6 is a cross-sectional view of a modular actuator according to the present description.
Figure 7:
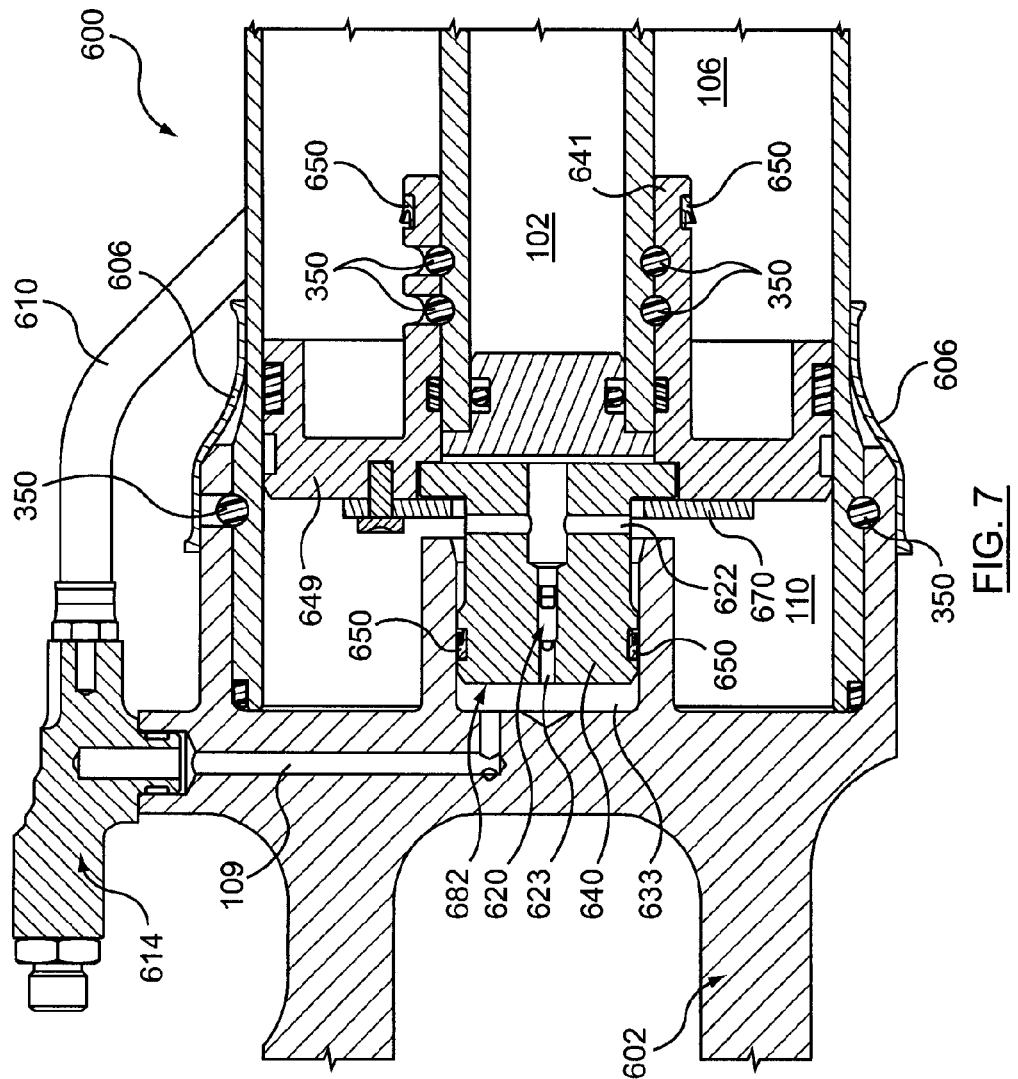
FIG. 7 is a cross-sectional view of a portion of the modular actuator showing the snubbing engagement of the piston.
Figure 9A:
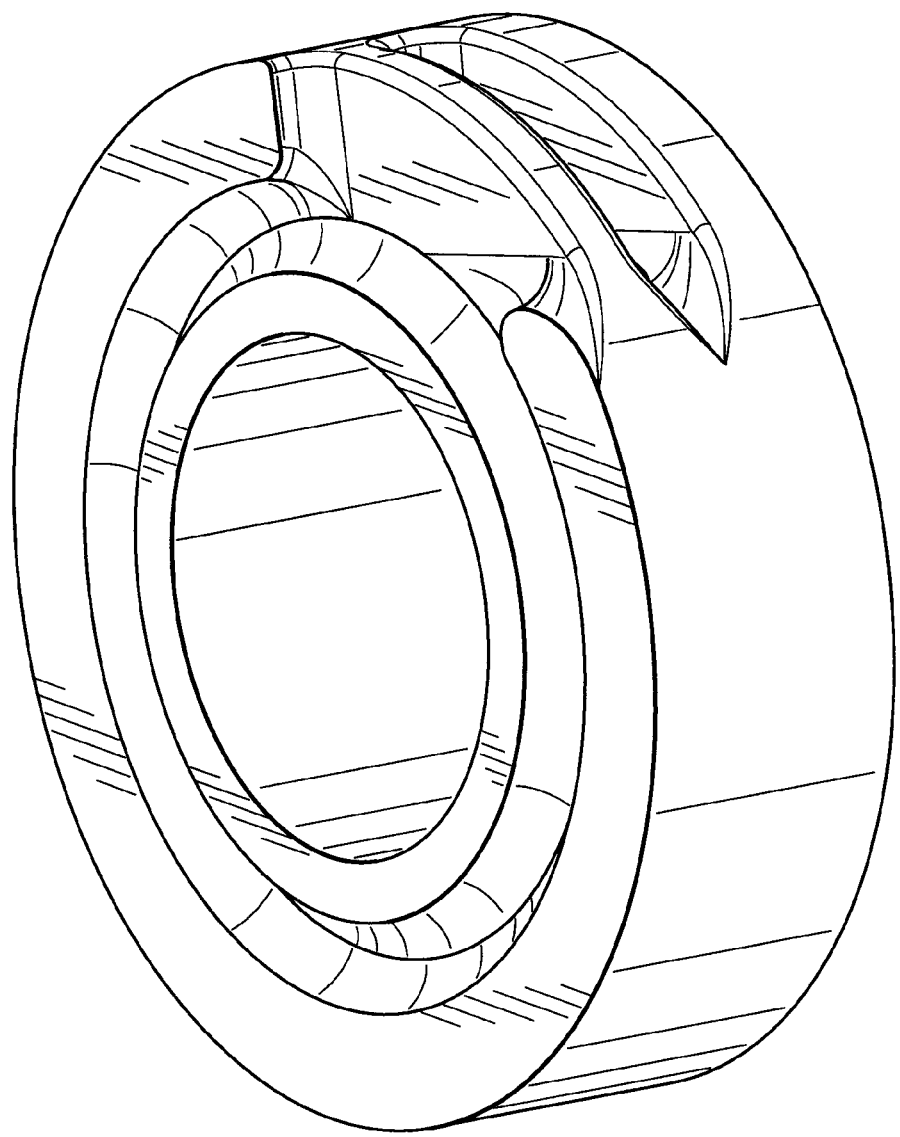
FIGS. 9A-E each show perspective cross-sections of the inner and outer components illustrating the groove and tangential slot with and without the retention wire installed.
Figure 9B:
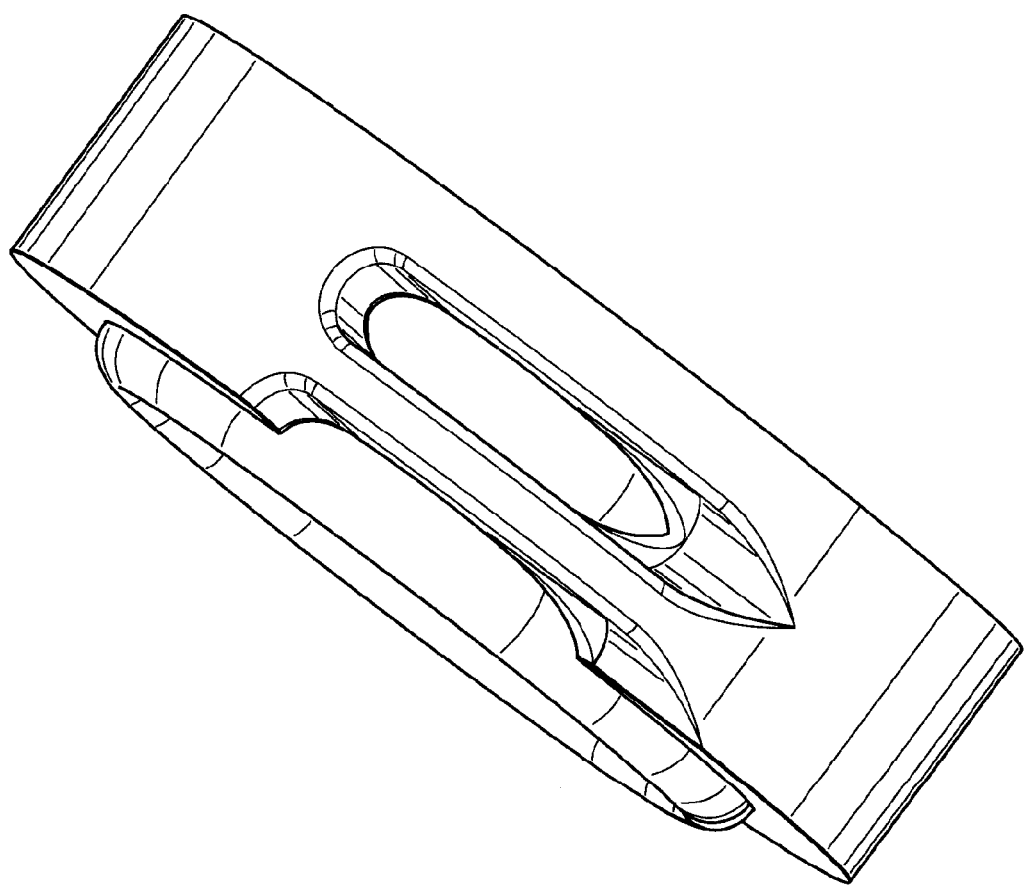
Figure 9C:
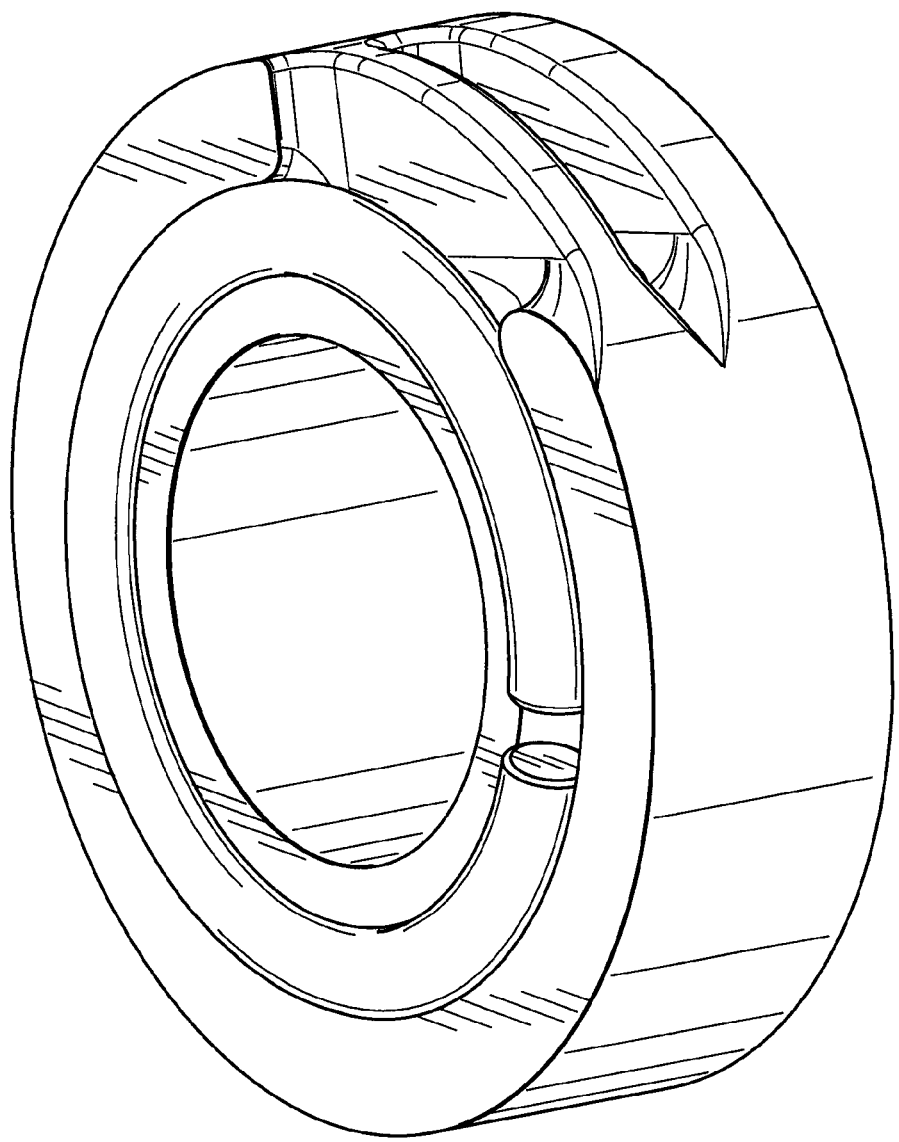
Figure 9D:
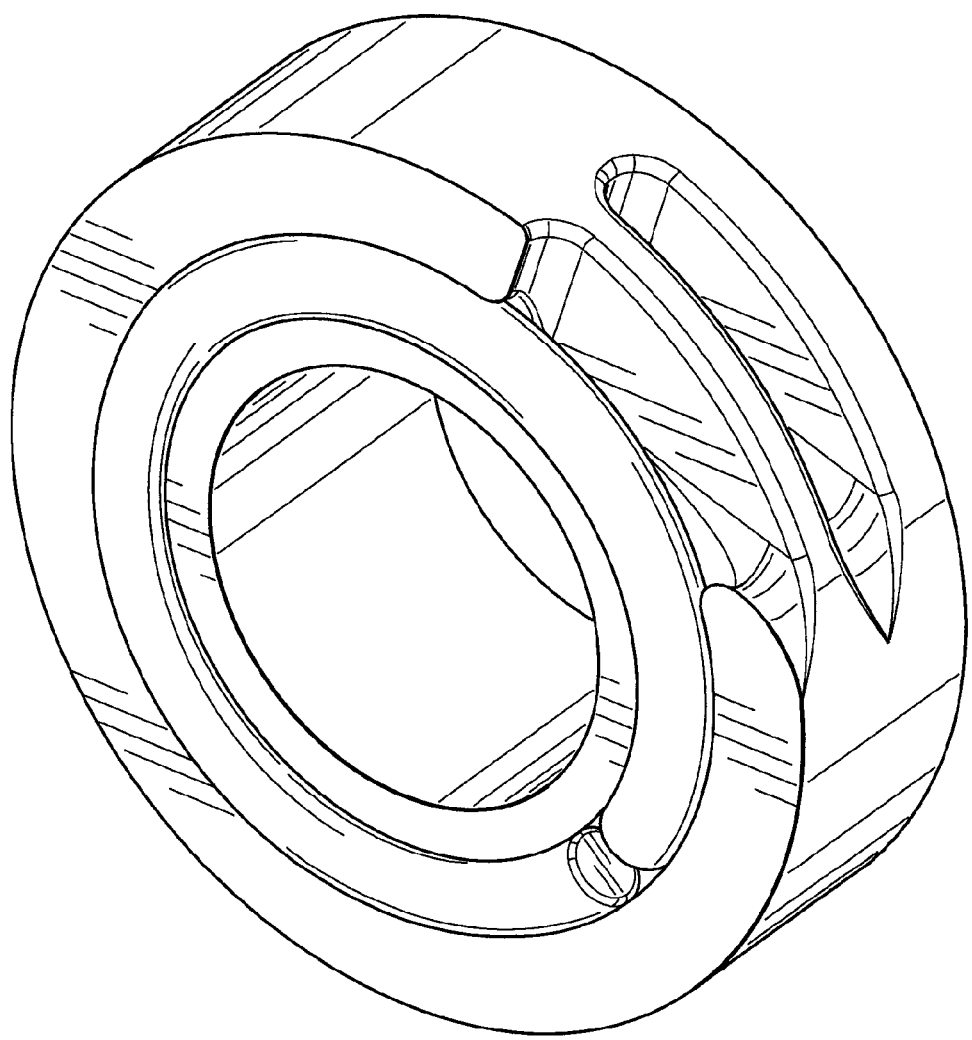
Figure 9E:
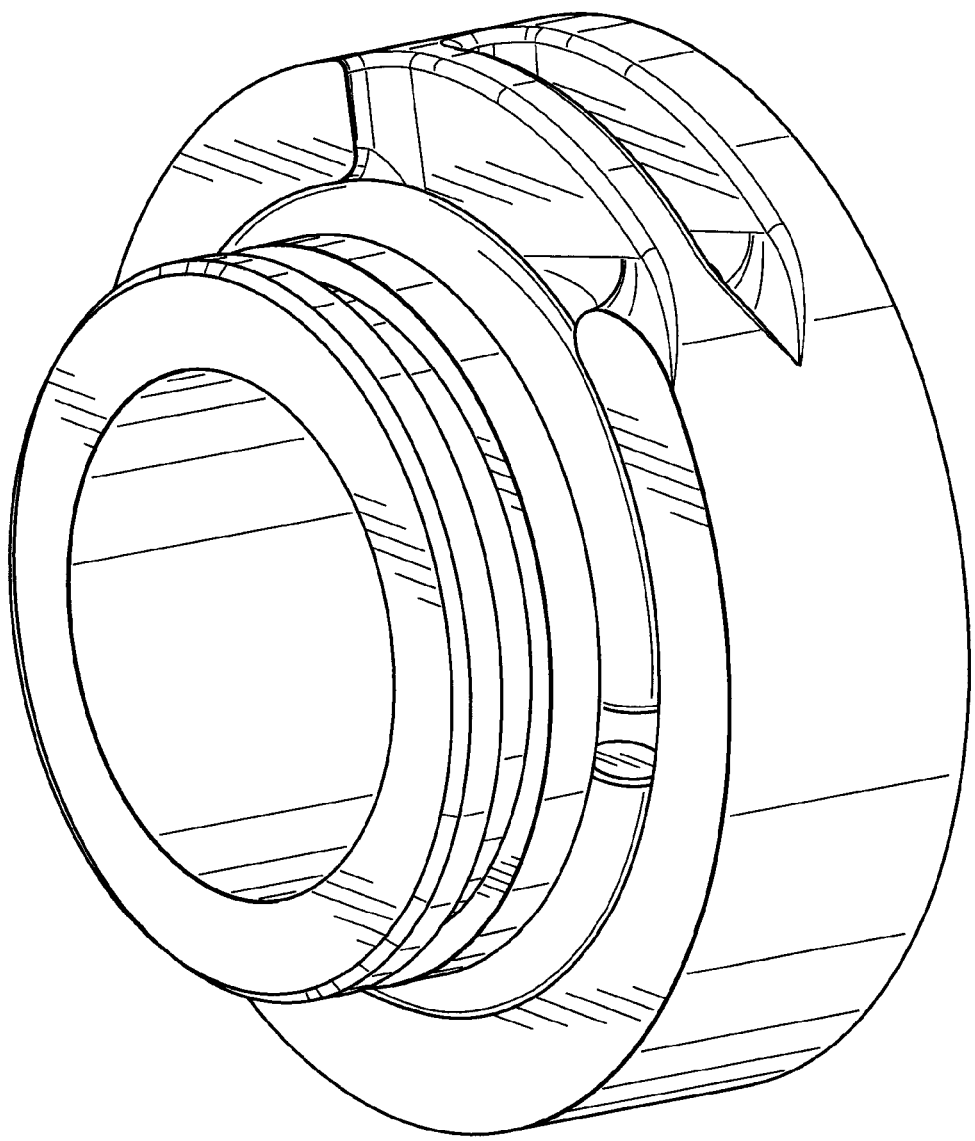

FIGS. 6 and 7 show the interior of a modular linear actuator 600 according to one embodiment of the present invention.

Referring to FIG. 6, the modular linear actuator 600 comprises a cylindrical housing assembly 104 having a closed end 154 and an open end 152. The cylindrical housing assembly 104 houses a piston rod assembly 102. The piston rod assembly 102 is linearly slideable within the interior of the cylindrical housing assembly 104 between an extended position and a compressed position.

The piston rod assembly 102 has a first end 112 proximal to the closed end 154 of the cylindrical housing assembly 104 and a second end 120 distal to the closed end 154 of the cylindrical housing assembly 104, when the piston rod assembly 102 is located within the cylindrical housing assembly 104.

A piston head 649 is removably attached to the first end 112 of the piston rod 102. The piston head 649 has an extension 641 that is received on and surrounds a portion of the first end 112 of the piston rod assembly 102. A contact seal 650 extends radially outwardly from the extension 641 and forms a seal with the gland cavity 630.

The piston head 649 provides snubbing engagements with each of the closed end 154 and open end 152 of the cylindrical housing assembly 104 when the piston rod assembly 102 is in the compressed and extended positions, respectively. The piston head 649 extends from the end of the piston rod assembly 102 and abuts the inner side wall of the cylindrical housing assembly 104 thereby separating two sealed pressure vessels: the first chamber 110 and the second chamber 111. The first chamber 110 is defined at least by the piston head 649 and the closed end 154 of the cylindrical housing assembly 104. The second chamber 111 is defined at least by the piston rod assembly 102, the piston head 649 and a gland 632 at the open end of the cylindrical housing assembly 104.

A first attachment mechanism 350 removably attaches several components in the actuator to each other. For example, at least one attachment mechanism 350 removably connects a lug end 602 to an exterior of the cylindrical housing assembly 104. The lug end 602 attaches the actuator 600 to a first component. Similarly, at least one attachment mechanism 350 removably attaches a rod end 604 to the second end 120 of the piston rod assembly 102. In the illustrated embodiment in FIG. 6, two attachment mechanisms 350 are shown connecting these two components. The rod end 604 is for attaching the piston rod assembly 102 to a second component. The operation of the actuator 600 moves the piston rod assembly 102 between a compressed position and an extended position thereby oscillating the rod end 604 relative to the lug end 602 causing the second component (which is attached to the rod end 604) to move relative to the first component (which is attached to the lug end 602). The use of the attachment mechanisms, or retention wires, allows for movement of these components while reducing, or preventing, free play between the attached components.

The lug end 602 further defines a cavity 633 for receiving the piston head 649. The interaction of the piston head 649 and the cavity 633 will be described further below with reference to FIG. 7.

A hydraulic fitting 614 is attached to the lug end 602. A hydraulic banjo fitting 612 is attached to the cylindrical housing assembly 104 near the open end 152 of the cylindrical housing assembly 104. The hydraulic fitting 614 and the hydraulic banjo fitting 612 are fluidly connected via a transfer tube 610. The transfer tube 610 includes a passage that allows fluid to flow from the hydraulic fitting 614 to the hydraulic banjo fitting 612. A passageway 109 fluidly connects the cavity 633 to the hydraulic fitting 614 and to the transfer tube 610.

In an alternate embodiment, there is no transfer tube 610 and the hydraulic fitting 614 is not fluidly connected to the hydraulic banjo fitting 612. In another embodiment, the hydraulic banjo fitting 612 is a separate bolt-on hydraulic fitting. Similarly, the hydraulic fitting 614 can be a separate bolt-on hydraulic fitting.

Rubber boots 606 are attached over each mechanical connection for protecting the mechanical connection from corrosion and abrasion. For example, the rubber boots 606 can prevent or inhibit dust, dirt or other environmental contaminants from entering into the mechanical connections (e.g. the retention wire 350 attachments) thereby protecting the internal surfaces of the parts of the actuator 600 at the attachment locations from corrosion and abrasion. By way of further example, each rubber boot 606 forms an air-tight seal over the respective mechanical connection. A rubber boot 606 covers the connection between the lug end 602 and the closed end 154 of the cylindrical housing assembly 104. Another rubber boot 606 covers a portion of the open end 152 of the cylindrical housing assembly 104. A rubber boot 606 also covers the connection between the piston rod assembly 102 and the rod end 604.

A gland 632 is attached to the interior 106 of the cylindrical housing assembly 104 proximal the open end 152 of the cylindrical housing assembly 104. The gland 632 has a central opening that is sized to allow the piston rod 102 to pass through it. The gland 632 forms seals against the cylindrical housing assembly 104 and against the piston rod assembly 102. A portion of the gland 632 facing the interior 106 of the cylindrical housing assembly 104 together with the piston rod assembly 102 define a gland cavity 630. An orifice or gland passage 690 fluidly connects the gland cavity 630 to the transfer tube 610 through the hydraulic banjo fitting 612. The gland passage 690 also connects the chamber 110 to the transfer tube 610 through the hydraulic banjo fitting 612. There is also a flow control device 620 inside the gland 632 to control the flow of fluid from the chamber 110 to the transfer tube 610 through the hydraulic banjo fitting 612.

As stated above, the piston head 649 is removably attached to the piston rod assembly 102. A retention plate 670 removably secures a spear 640 to the piston head 649, as clearly shown in FIG. 7. A flow control device 620 is contained inside an internal channel 623 inside the spear 640. The spear containing the flow control devices 620 is also referred to as a floating plunger. The spear 640 extends from the piston head 649 to a distal end 682. The passages 622 fluidly connect the first fluid chamber 110 to an internal channel 623 containing the flow control device 620 inside the spear 640. The internal channel 623 is also fluidly connected to the cavity 633. Fluid flowing through the internal channel 623 passes through the flow control device 620 between the first fluid chamber 110 and the cavity 633. The spear 640 slideably and sealably engages with the lug end 602 between a discharged position and an initial position.

A contact seal 650 circumnavigates the spear 640 between the passages 622 and the distal end 682 forming a seal with the lug end 602 when the piston head 649 is received in the cavity 633.

The retention plate 670, connecting the spear 640 to the piston head 649, can be secured to the piston head 649 using a nut and bolt or by other mechanisms such as a threaded connection, swaging, cir-clip, for example. Alternatively, the spear 640 may be integral with the piston head 649 such that the spear 640 forms part of the piston head 649. The piston head 649 together with the spear 640 form a floating plunger.

When the piston rod assembly 102 is in the extended position, the extension 641, of the piston head 649, fits snugly into the gland cavity 630 so that the contact seal 650 on the extension 641 forms a seal against the wall of the gland cavity 630, not shown. Further, when in the extended position, the spear 640 is separated from and disengaged from the lug end 602 so that the cavity 633 and the chamber 110 are directly fluidly connected. For example, hydraulic fluid can flow through the passageway 109, through the cavity 633 and into the chamber 110 and vice versa without passing through the spear 640.

When the piston rod assembly 102 is in the compressed position, as shown in FIGS. 6 and 7, the extension 641 is separated from the gland cavity 630 and gland 632 so that the gland cavity 630 and gland 632 are fluidly connected so that hydraulic fluid can flow from the interior 106 through the cavity 630 into the gland 632 and vice versa.

When the piston rod assembly 102 is in the compressed position, the spear 640 engages with the lug end 602 and the distal end 682 of the spear 640 is distal to the lug end 602, as shown in FIG. 7. When the spear 640 is in this position, the contact seal 650 forms a seal with the lug end 602 thereby fluidly sealing the cavity 633 from the chamber 110. However, the fluid (e.g. hydraulic fluid) can pass from the chamber 110, through the passages 622, through the channel 623 and through the flow control device 620 and into the cavity 633. As the spear 640 moves within the cavity 633, the contact seal 650 maintains the seal with the lug end 602. The use of the flow control device 620 and the contact seal 650 allows greater control of the snubbing performance without requiring very precise tolerances to manufacture the spear 640 and cavity 633. The snubbing arrangement is used with the modular retention wire design allows for the use of less precise/greater tolerances when using the retention wires. This also avoids drilling holes into the cylinder because the pressures experienced are too high (~5000 psi range) for drilled holes.

The flow control device 620 controls the rate at which the fluid flows between the passage 622 and through the channel 623 in which the flow control device 620 is located. Therefore, when the spear 640 is slideably and sealably engaged with the lug end 602 (e.g. when sliding between the initial position and the discharge position) the flow of fluid out of the chamber 110 is completely controlled by the flow control device 620.

Alternatively, an extension flow control device 620 is located inside the piston head 649, shown in FIG. 8, and passages fluidly connect the chamber 110 to the cavity 633 through the piston head 649. In this embodiment, the spear 640 would include a fluid passage 623 that would be in fluid communication with the passage within the piston head 649 in which the flow control device 620 would be located and passages 622 would not be present. Additional fluid passages will be located within the piston head 649 to allow for flow of fluid from the chamber 110 into the piston head 649 and through the flow control device 620. An example of one location for such a fluid passage is indicated at 822, however it will be understood that the location of the passage is not limited to this position.

As described above, in the illustrated embodiment the retention wire 350 forms a mechanical connection that has free play, or relative movement of fastened components under load. Where required (e.g. between the piston head and the piston rod since load changes direction along the piston head, which would cause it to move. It is not required elsewhere because in other areas the load is always out, radial), the retention wire 350 connection can introduce a spring load or resisting axial force between the fastened components that is sufficient to resist anticipated applied loads preventing the free play that would otherwise be present.

The retention wires illustrated in 5A to 5C prevent free play because of the axial force provided by the waves (or offset in the case of 5A) in the wire. The three wires are designed for progressively higher loads in the actuator to prevent free play depending on the load experienced in that area. It depends on the applications and the requirements.

These retention wires 350 employ an arrangement that compensates for the free play between the connected elements of the actuator 600 and within the component(s) that the actuator 600 operates on (e.g. the first component and the second component). This compensation prevents backlash in the actuator 600 motion (i.e. when the actuator 600 oscillates between the compressed and extended positions). Without this type of compensation, the backlash in the actuator 600 can cause undampened, destructive oscillatory motion of the component(s) controlled by the actuator 600.

To compensate for the free play, the retention wires 350 are formed in shapes that provide an axial force along the longitudinal axis of the piston rod assembly 102. For example, the retention wires 350 are in helical shapes (as shown in FIG. 5A) or have one or more waves offset from the plane of the wire 350 (as shown in FIGS. 5B-C). The pitch of the helix can be chosen to provide the required axial force and limit installation torque. Further, two retention wires 350 can be co-located to attach the extension 641 to the piston rod assembly 102. Similarly, two retention wires 350 can be co-located to attach the rod end 604 to the piston rod assembly 102.

Alternatively, either or both of the piston head 649 and gland 632 are attached with a conventional retaining ring and nut arrangement. Further, the rod end 604 can be integral to the piston rod assembly 102 or can be attached using a threaded connection.

Operation of the Modular Linear Actuator

In operation, changes in the hydraulic pressure in the chamber 110 relative to the hydraulic pressure in the interior 106 of the cylindrical housing assembly 104 causes the piston rod assembly 102 to move. The movement of hydraulic fluid through the transfer tube 610 between the chamber 110 and the interior 106 of the cylindrical housing assembly 104 causes the pressure in the chamber 110 relative to that in the interior 106 of the cylindrical housing assembly 104 to change. The piston rod assembly 102 can, for example, oscillate between the extended and compressed positions through the change in relative pressure between the chamber 110 and the interior 106 of the cylindrical housing assembly 104.

As the piston rod assembly 102 moves from the extended position to the compressed position the piston head 649 and spear 640 push the hydraulic fluid from the chamber 110 and cavity 633 into the passageway 109, which is fluidly connected to the transfer tube 610, thereby pushing the hydraulic fluid towards the hydraulic banjo fitting 612. As the piston rod assembly 102 continues moving towards the compressed position, the spear 640 will engage with the lug end 602, and more particularly will be received within cavity 633, and the contact seal 650 circumnavigating the spear 640 will form a seal with the lug end 602 thus defining the initial position of the spear 640. The hydraulic fluid is then only able to pass into the cavity 633 from the chamber 110 through the passage 622 and through the flow control device 620 and then the discharge passage 623. The piston rod assembly 102 and hence the spear 640 continue to move towards the lug end 602 until the compressed position is reached (also defined as the discharge position of the spear 640) with the fluid passing from the chamber 110 only through the flow control device 620. The flow control device 620 controls the rate of fluid flow. For example, the flow control device 620 controls the rate at which the fluid flows between the passage 622 and the discharge passage 623. Therefore, as the spear 640 moves from the initial position to the discharge position, the fluid flow from the chamber 110 (and hence the hydraulic pressure of the fluid in the chamber 110) is precisely controlled using the flow control device 620 resulting in a precise snubbing operation.

The flow control device 620 slows fluid flow during the snubbing stages of extension and compression to ensure precise timing and snubbing. According to one embodiment, the flow control device 620 is a sharp orifice or flow control device, for example a VISCO JET™ flow restrictor. The size of the orifice is selected to give the desired reduction in piston rod assembly 102 velocity. The flow control device 620 can, for example, be a commercial flow control device.

The contact seal 650 ensures that there is no secondary flow around the spear 640 (or piston head 649).

It will be understood from the above that the use of the flow control device within the piston head and spear, as discussed herein, allows for precise control of the flow of the hydraulic fluid within the actuator, as required in the aerospace field. In addition, the snubbing embodiment described herein does not require holes to be drilled in the actuator, thereby reducing high stress concentrations where fatigue may occur, as per known alternative snubbing arrangements.

One or more currently preferred embodiments have been described by way of example. It will be apparent to persons skilled in the art that a number of variations and modifications can be made without departing from the scope of the invention as defined in the claims.

What is claimed is:

1. A modular linear actuator, comprising:
   a piston housing having a closed end and an open end, the open end including a gland having a passageway to an interior of the piston housing;
   a piston rod slideable within the interior of the piston housing between an extended position and a compressed position, the piston rod having a first end oriented towards the closed end of the piston housing and a second end oriented away from the closed end of the piston housing;
   a retention wire removably attaching a lug end to the closed end of the piston housing, the lug end defining a cavity fluidly connected to a flow passage extending out of the lug end and engaging the gland passageway; and
   a piston head removably attached to the first end of the piston rod using a piston retention wire, the piston head comprising a spear configured to slidably and sealably engage the cavity, the spear having an axial channel and a transverse passage that fluidly connects the axial channel with the interior of the piston housing, wherein the piston head is configured to provide a snubbing engagement with the lug end;
   wherein the piston head and the closed end of the piston housing define a first chamber for holding hydraulic fluid therebetween and the piston head and the open end of the piston housing define a second chamber for holding hydraulic fluid therebetween, the piston head comprises a flow control device in the axial channel of the spear to provide the snubbing engagement with the lug end by controlling the rate of flow of hydraulic fluid from the first chamber to control pressure in the first chamber relative to pressure in the second chamber.

2. The modular linear actuator of claim 1, wherein a first circumferential notch on an inner surface of the lug end aligns with a second circumferential notch on an outer surface of the closed end of the piston housing to receive the retention wire.

3. The modular linear actuator of claim 2, wherein the lug end defines a tangential slot connecting an outer surface of the lug end to the first circumferential notch of the lug end, the tangential slot for inserting and removing the retention wire to attach or detach the lug end to the closed end of the piston housing.

4. The modular linear actuator of claim 3, wherein the retention wire further comprises a hook to latch onto the outer surface of the closed end of the piston housing.

5. The modular linear actuator of claim 1, wherein the lug end is removably attached to the piston housing using a second retention wire.

6. The modular linear actuator of claim 5 wherein the second retention wire either: is shaped as a helix to provide an axial force in the direction of the longitudinal axis of the piston rod for compensating for free play between the piston rod and the piston head; or comprises at least one wave for providing a force between the piston rod and the piston head for compensating for free play between the piston rod and the piston head.

7. The modular linear actuator of claim 1 wherein the retention wire either: is shaped as a helix to provide an axial force in the direction of the longitudinal axis of the piston housing for compensating for free play between the piston housing and the lug end; or comprises at least one wave for providing a force between the lug end and the piston housing for compensating for free play between the lug end and the piston housing.

8. The module linear actuator of claim 1, wherein the spear further comprises a contact seal that dynamically re-engages the cavity.

9. The modular linear actuator of claim 8 wherein the spear is attached to the piston head using a retention plate.

10. The modular linear actuator of claim 1 wherein the gland is removably attached to the open end of the piston housing, the gland defining a gland cavity opening into the second chamber, the piston head further comprising a piston head extension that sealingly engages the gland cavity in the extended position, the gland further comprising a second flow control device coupled to the gland cavity to provide the snubbing engagement in the extended position by controlling the rate of flow of hydraulic fluid from the gland cavity.

11. The modular linear actuator of claim 10, wherein the piston head extension further comprises a contact seal that dynamically re-engages the gland cavity.

12. The modular linear actuator of claim 10 further comprising a hydraulic fitting attached near the open end of the piston housing and coupled to the gland cavity.

13. The modular linear actuator of claim 10 wherein the gland is removably attached to the open end of the piston housing by a second retention wire.

14. The modular linear actuator according to claim 1, wherein the retention wire comprises an elongate flexible wire having two free ends, the elongate flexible wire forming a substantially circular shape in a first plane and comprising one or more waves spaced along the elongate flexible wire, the waves extending in a second plane.

15. The retention wire of claim 14, wherein the one or more waves form a sinusoidal pattern along the wire.

16. The retention wire of claim 14, wherein the free ends are offset from each other.

17. The retention wire of claim 14, wherein the waves form a helical pattern in the second plane.

* * * * *